Sept. 4, 1951          M. VICK          2,566,387
BICYCLE SEAT HEIGHT ADJUSTER
Filed July 30, 1948
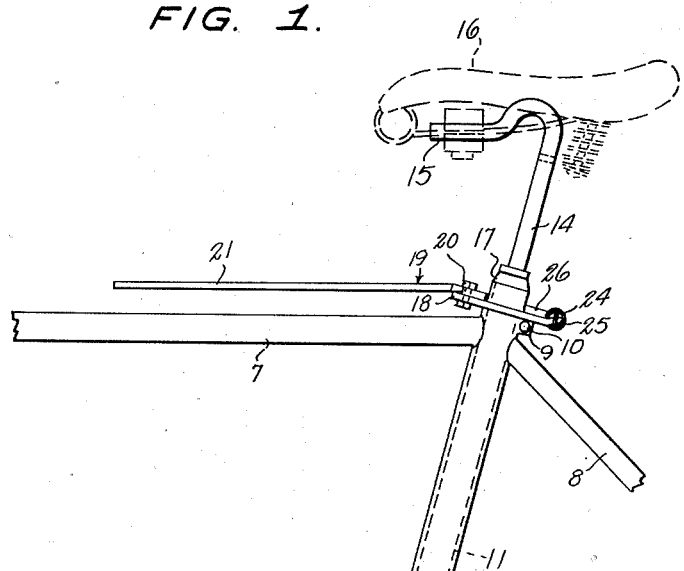
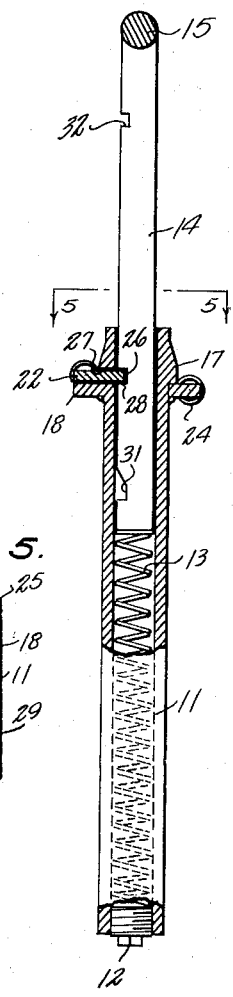
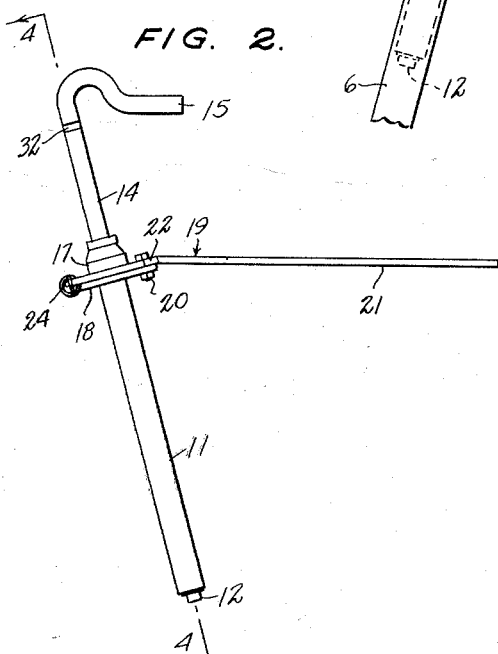
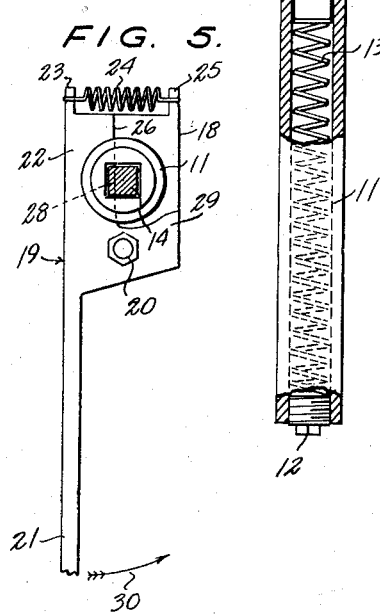
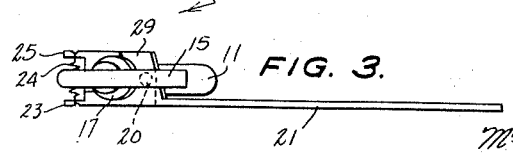
INVENTOR.
MILLARD VICK,
BY
McMorrow, Berman & Davidson
ATTORNEYS.

Patented Sept. 4, 1951

2,566,387

UNITED STATES PATENT OFFICE 2,566,387

BICYCLE SEAT HEIGHT ADJUSTER

Millard Vick, Portsmouth, Va.

Application July 30, 1948, Serial No. 41,592

2 Claims. (Cl. 155—5.24)

This invention relates to adjustable bicycle seats, and particularly to a device for adjusting and maintaining the height of a bicycle seat at different levels.

The main object of my invention is to provide an adjuster for a bicycle seat which is capable of supporting and maintaining the latter at comfortable riding height and also at a lower level to allow the rider, after the bicycle has been stopped, to apply the feet to the ground without dismounting from the bicycle.

Another object is to provide a device of the indicated character which is instantly and conveniently releasable from the position in which it supports the seat in the elevated riding position to allow the seat to be lowered at will into the stopping position.

A further object is to provide such a device with accessible operative means by which to control the heat height-adjusting device and thereby release the same at will.

It is also an object to produce such a seat height-adjuster in simple and yet effective form so that it will be reasonable in cost, durable and not likely to get out of order.

A practical object is, of course, to make a device of this character which does not require rebuilding or serious alteration of the bicycle to apply it thereto.

Other objects and advantages of my invention will appear in further detail as the specification proceeds.

In order to facilitate ready comprehension of this invention for a proper appreciation of the salient features thereof, the invention is illustrated on the accompanying drawing forming a part hereof, and in which:

Figure 1 is a fragmentary side elevation of the frame of the bicycle with the seat adjuster embodying the present invention applied thereto in raised position for supporting the bicycle seat in riding position;

Figure 2 is a side elevation as seen from the opposite side of the bicycle seat height adjuster alone;

Figure 3 is a top or plan view of the device of Figure 2;

Figure 4 is a section taken on line 4—4 in Figure 2;

Figure 5 is a transverse section taken on line 5—5 in Figure 4.

In the various views the same parts are referred to by means of the same reference numerals.

When riding upon a bicycle, it is naturally necessary that the seat thereof is at the proper height for pedaling comfortably and efficiently with a minimum of fatigue, but such height of the seat is determined exclusively by this consideration and bears no relation whatever to a desirable position of the rider of the bicycle which would facilitate applying the feet to the road when the bicycle has been temporarily stopped, without the rider dismounting from the bicycle. For this purpose, the seat should necessarily be much lower than at the comfortable riding level, and in fact, should offer clearance above it for freedom of movement when it is desired to assume a standing posture over the bicycle for a temporary stop. It has, therefore, occurred to me that a bicycle seat should be instantly adjustable in height from efficient riding position to a lowered clearance position at will, and also readily capable of again being restored to riding position when desired.

After duly considering this problem, I have succeeded in producing a height-adjusting device for a bicycle seat which avoids the mentioned disadvantages and fulfills the foregoing objects, as will now be particularly described.

Hence, in the practice of my invention, and referring again to the drawing, with particular reference to Figure 1, a portion of the frame of a bicycle is shown including a hollow saddle post 6, the upper horizontal brace 7 and one of the rear inclined braces 8 running down to the rear wheel, the upper end of the saddle post 6 being rearwardly split and having the rearwardly-extending lugs 9 (one shown) with a clamping screw 10 for drawing the lugs together and thereby constricting the upper end of the hollow post 6. Into the latter is fitted a downwardly-extending sleeve or tube 11 closed at the lower end by means of a screw plug 12 upon which rests a long compression spring 13 supporting the lower end of a slidable solid saddle post 14 which at the upper end has a forwardly-directed seat-supporting end 15 to which a seat or saddle, generally indicated at 16 in broken lines, may be secured. At the upper end the sleeve 11 has an integral flanged portion 17 beneath which is fixed a plate 18 by welding, brazing or otherwise attaching the same permanently in place. The plate 18 just mentioned is adapted to rest upon the upper end of the hollow saddle post 6 and when the lugs 9 are clamped together by means of screw 10, the hollow post will also grip the sleeve 11 and retain the same in fixed position on said post with the upper flanged portion 17 projecting above the latter.

Upon the forward portion of the mentioned upper plate 18 is pivotally mounted a lever, generally indicated at 19, by means of a pivot screw or bolt 20 extending through both the lever 19 and plate 18 with the lever provided forwardly of the pivot 20 with a lever arm 21 extending in substantial parallelism above the horizontal brace 7 of the bicycle frame, while rearwardly of the pivot 20 the lever has a rearwardly-extending locking lug 22 terminating in a spring-attachment finger 23 to which a spring 24 is connected at one end thereof, while the other end of said spring is connected to a rearwardly-extending attachment finger 25 upon the rear of plate 18. The rearwardly-extending locking lug 22 has a working edge 26 extending horizontally into a slot 27 in the flange 17 and normally extends into a notch 28 in the intermediate portion of one side of the solid saddle post 14, as best seen in Figure 4, for positively supporting this post in the raised position for proper riding height of the saddle or seat 16. On the opposite side of the lever 19, with respect to the locking lug 22, is a stop finger or lug 29 serving to engage against the sleeve 11 when lever arm 21 is shifted in the direction of the arrow 30 for the purpose of clearing the working edge 26 of the locking lug 22 out of notch 28 in the solid post 14, the stop finger 29 then serving to prevent undue operation of the lever beyond the desired clearance point just mentioned. Adjacent to the lower end of solid saddle post 14 is a terminal notch 31, while in a raised position upon the same post only a short distance below the saddle-supporting end 15 is a further notch 32, the purpose of which will be immediately explained.

The lever 19 is pivoted by means of pivot 20 to the plate 18 which is naturally rigidly fixed upon the sleeve 11 clamped in hollow post 6. The lever may be shifted about pivot 20 by moving arm 21 thereof in the direction of arrow 30, as shown in Figure 5, when the working edge 26 will be freed from notch 28 in the solid post 14, and the weight of the rider on seat 16 will then suffice to lower the solid post 14 in opposition to spring 13 until the working edge 26 of locking lug 22 will enter the upper notch 32 of the post in the lowest position of seat 16, so that it is possible for the rider to stand up with the feet on the road in order to alight from the bicycle. The spring 24 tends to draw the rearward spring-attachment fingers 23 and 25 together and thereby urge the working edge 26 of lug 22 into whatever notch may be adjacent to the working edge so that as the post 14 is for the moment rising or falling, the working edge 26 will snap into position either in the upper notch 32 or the lower notch 28, as the case may be. Assuming that the locking lug 22 has the working edge 26 thereof occupying notch 32 in the lowered position of seat 16, it is easily possible for a rider to swing one leg over the bicycle and place his feet on the pedals and start riding while the seat is in this low position. While thus riding or at the beginning of the ride, it is possible to raise the seat by merely knocking lever arm 21 with the right knee to disengage locking lug 22 from notch 32 and with the rider allowing the main portion of his weight to rest on the pedals in order to allow spring 13 to raise the solid post 14, the locking edge 26 of lug 22 will immediately snap into notch 28 of post 14, when the seat will be in the raised riding position for normal comfortable and convenient pedaling. The lower notch 31 is present in order to prevent the post 14 from being ejected by spring 13 from the hollow post sleeve 11, should the lug 22 pass notch 28 by accidental operation. When the rider is about to alight from the bicycle, it is merely necessary to knock the right knee into the lever arm 21 and this arm will immediately cause the working edge 26 to withdraw from notch 28 and then if the rider will allow his entire weight to rest on the seat 16, the post 14 will depress spring 13 and lug 22 will then engage the other upper notch 32, when the seat will again be in the low position so that the feet may be placed on the road, both to stop the bicycle from moving forwardly further, and also to alight from the same. The low position of the seat is also useful for starting when first riding off from the starting point, after which the seat may be raised during the course of the ride.

Within the upper flange portion 17, the sleeve may have the bore thereof therein made square or rectangular, as best seen in Figure 5, while the entire length of the solid post 14 below the horizontal saddle-supporting portion 15 thereof may be correspondingly square in cross-section to prevent axial rotation of this post while freely allowing longitudinal movement thereof to raise or lower the seat.

Manifestly, variations may be resorted to and parts and features may be modified or used without others within the scope of the appended claims.

Having now fully described my invention, I claim:

1. A seat height-adjuster for a bicycle seat or saddle, including a sleeve adapted to be inserted into the hollow saddle post of said bicycle, the sleeve having a closed bottom and containing a compression spring, external means upon the upper end of said sleeve for normally resting upon the upper end of said hollow saddle post, there being a horizontally disposed slot extending inwardly of and through said sleeve adjacent the upper end, a lever pivotally mounted upon said sleeve having a forwardly extending operating lever arm upon one end and a locking lug upon the other end thereof extending through said slot, a solid saddle post having a substantially horizontal saddle-supporting portion upon the upper end of the same and extending with its other end slidably down into said hollow saddle post and upon the latter end having at least two notches spaced apart and adapted to be individually engaged by the locking lug of said lever to determine a high pedaling position for said saddle and a low stopping position thereof, and a spring biasing said locking lug into engagement with either one of said notches.

2. A seat height-adjuster for a bicycle seat or saddle, including a sleeve adapted to be inserted into the hollow saddle post of said bicycle, a closed bottom upon the sleeve and a compression spring within the latter resting on said closed bottom, a plate fixed about the upper end of said sleeve and adapted normally to rest on the upper end of said hollow saddle post, a solid saddle post having a substantially horizontal saddle-supporting portion upon the upper end thereof and extending with its other end slidably down into said hollow saddle post and upon the latter end having at least two notches spaced apart, a lever pivotally mounted upon the plate, a forwardly-extending operating arm upon the lever and a locking lug extending rearwardly at one side of the saddle post in a side slot in said sleeve and adapted to engage in either one of the two notches in said solid saddle post, a pair of spring-attachment fingers projecting individually from said plate and from said locking lug rearwardly of the pivot mounting of said lever on said plate, a tension spring connected to the fingers and biasing the locking lug into said notches, the latter individually determining the high pedaling position for said saddle and the low stopping position thereof, and a stop finger on the lever on the opposite side with respect to the locking lug for limiting the pivotal movement of said lever, and a fixed guide means upon the upper end of said sleeve for guiding the lower end of the solid saddle post and preventing axial rotation but allowing longitudinal movement thereof.

MILLARD VICK.

REFERENCES CITED

The following references are of record in the file of this patent:

UNITED STATES PATENTS

| Number | Name | Date |
| --- | --- | --- |
| 640,483 | McKenzie | Jan. 2, 1900 |

FOREIGN PATENTS

| Number | Country | Date |
| --- | --- | --- |
| 418,079 | France | Sept. 19, 1910 |
| 528,023 | France | Aug. 6, 1921 |
| 34,431 | Denmark | Apr. 15, 1925 |